Patented Sept. 26, 1933

1,927,929

UNITED STATES PATENT OFFICE 1,927,929

PLASTIC OF HIGH SULPHUR CONTENT AND PROCESS OF MAKING THE SAME

Carleton Ellis, Montclair, N. J., assignor to Ellis-Foster Company, a corporation of New Jersey No Drawing. Application April 22, 1929
Serial No. 357,354

6 Claims. (Cl. 106—23)

This invention relates to compositions comprising a plastic sulphured or sulphurated ethylene and sulphurated phenolic body miscible therewith, and to the process of making such composition comprising reacting on ethylene material with an alkaline sulphide, preferably in the presence of the sulphured phenol, whereby a substance of high plasticity, useful in various plastic arts, results.

When symmetrical ethylenedichloride,

$CH_2Cl\cdot CH_2Cl$, is heated with an aqueous solution of an alkaline sulphide, such as sodium sulphide or calcium sulphide, preferably containing a higher proportion of sulphur than the monosulphide, including the various polysulphides, a plastic sulphur resin is obtained which varies in physical character from a hard resinous product to softer and more flexible or rubbery resinous bodies. The higher degree of flexibility is secured ordinarily by reacting with proportions of the polysulphides such as to produce bodies of higher content of combined sulphur. These ethylene sulphide plastics have the disadvantage of very slight solubility or complete insolubility in the usual organic solvents of resins. In mixing such plastics with fillers and various extending substances on milling rolls in accordance with the usual methods employed in the rubber and synthetic resin industry, difficulty arises due to the lack of coherence of the sulphured ethylene compounds and the mechanical step of mixing in this manner therefore may cause considerable difficulty.

In the present invention I aim to incorporate or react with the sulphured ethylene, bodies also preferably containing a high content of sulphur, which bodies are represented and typified by various sulphur phenol resins such as those produced by reaction between phenol, cresol, xylenol and the like and sulphur chloride. Preferably sulphur phenol resins containing 40 to 60 per cent or so of combined sulphur are employed in conjunction with the sulphured ethylene in order to create the high plasticity desired.

The manner in which I preferably incorporate these two substances is by reacting symmetrical dichlorethylene with aqueous alkaline polysulphide in the presence of the sulphur phenol body or bodies.

As an illustration of such procedure I may prepare a suitable product of improved plasticity and coherence in the following manner:

Caustic soda 60 parts and sulphur 96 parts are boiled together with water to produce sodium polysulphide and the product so derived, containing about 150 parts of water, is mixed with ethylenedichloride 49–50 parts and 10 parts of the sulphur phenol resin, which has been prepared by reacting on phenol with twice its weight of sulphur monochloride. This mixture is heated to boiling for several hours under a reflux condenser until the ethylenedichloride has substantially disappeared. The plastic reaction product is kneaded in water to remove soluble compounds and may, if desired, finally be washed with a dilute acid solution. From the foregoing batch, which represents parts by weight, a product weighing approximately 100 parts is obtained. This is a light yellow soft product somewhat resembling molasses candy during that state when it is being "pulled". There is still present about 10% of water in the emulsified state and the material in this condition is extremely extensible, being capable of being drawn into strings of great length. Moreover, it is not sticky, but may be handled freely without adhesion to the hands or any surfaces with which it contacts, provided such contact is not maintained for a protracted period. On standing in containers for some time adhesion occurs, especially if the container is standing in a warm place, but the degree of stickiness or adhesion is comparatively small. On the other hand, the coherence as indicated is pronounced and such coherence, together with non-stickiness, makes it possible to introduce various fillers and extending agents when so desired, employing any suitable kneading or milling apparatus for the purpose.

In the foregoing illustration the sulphur phenol plastic does not dissolve readily in the ethylenedichloride in the cold, but goes almost completely into solution on warming. Consequently the reaction takes place with the ethylenedichloride and the sulphur phenol in intimate contact and the possibility exists for complex interreaction to progress, yielding a product of properties different from that of the ethylenedichloride plastic or the sulphur phenol plastic separately considered.

The plastic material or complex obtained in this way may be heated and dried to eliminate moisture. On heating at 105° C. for a time I noted in one instance a loss of about 6 or 7 per cent. Ordinarily there may be present in the neighborhood of 10% or thereabouts of moisture disseminated in an apparent emulsified condition in the mass. The elimination of water from so tenacious or tough a product ordinarily calls for exposure at a higher temperature, for example, 130° C., at which point on heating for a sufficient period, depending upon the quantities which are being dried, the opacity of the undried plastic disappears to a very considerable extent and a more translucent material results. I contemplate using in the plastic industry both the wet product or emulsion and the dried material, as well as products containing intermediate proportions of water.

In like manner a product of a tough character, but not having quite the same degree of smoothness in extension tests as that made by the foregoing illustration, may be prepared by using quick lime or calcium oxide in place of caustic soda or sodium hydroxide. Thus I may employ 35 parts of high grade quick lime (so-called chemical lime), 96 parts of sulphur and water, heating to make lime sulphur, and reacting with about 50 parts of ethylenedichloride and 10 parts (more or less) of the sulphur phenol body. In this case the reaction progresses in a somewhat different manner, the solution thickening and necessitating the addition of some water. Instead of 150 parts of water as used above, I find it desirable to have present about 250 parts of water in the case of the reaction with the lime sulphur.

As stated above, the sulphur phenol compound may be prepared from various phenolic bodies, the crude coal tar acids, creosote or xylenol distillates being the cheapest, but on the other hand not being capable of reacting with a high proportion of sulphur chloride. A xylenol resin may be prepared, for example, which is solid at room temperature, by reacting with an equal weight of sulphur chloride. Phenol, on the other hand, will react with the maximum proportion of sulphur chloride, ranging up to three times its weight or often higher. The hardness of the sulphur phenol made in this way varies greatly with the amount of sulphur in combination, ranging from soft sticky products almost of a viscous liquid type, with the low percentages of sulphur chloride, up to hard less soluble bodies when 3 to 3½ parts of sulphur chloride is used. Products made with from 1 to 2 parts of sulphur chloride to one part of phenol range from quite soft bodies to moderately firm resinous substances as the proportion of sulphur chloride increases. While I prefer to employ sulphur phenol compounds made with the aid of sulphur monochloride or dichloride, I do not limit myself in any way thereto, but may utilize plastics derived by heating phenol and sulphur in various proportions, especialy with an alkaline catalyst, iodine catalyst and the like. Furthermore, I embrace within the scope of the present invention any other substance or substances miscible with the ethylenedichloride sulphur plastic to form bodies or complexes of different physical qualities from those posessed by either of the components individually.

Without setting forth a long list of fillers, I may state that various mineral fillers, such as asbestos, china clay, mica and the like and organic fillers such as wood flour, ground cork, cotton flock and so forth, may be incorporated with the plastic composition of the present invention. In addition other substances such as rubber, crude, reclaimed or partially vulcanized, may be incorporated together with pitches and other substances commonly employed in rubber compounding, in so far as they are compatible with the essential plastic bodies of the present invention.

The illustrations set forth above should not be construed to impose any limitations because of their specific character, it being understood that many variations may be made in the proportions of the reacting substances or modifying agents and in their manner of incorporation. While I have illustrated the composition of the present invention by the employment of one part of the sulphur phenol to 5 parts of ethylenedichloride, I may change these proportions to a very wide degree, for example, using 2, 3, 4 or 5 parts of the sulphur phenol plastic to said 5 parts of ethylenedichloride. Or the proportions may be reversed and instead of having the ethylenedichloride sulphur plastic the major constituent it may become the minor constituent, the proportion of the sulphur phenol plastic being increased 6, 7, 10 or other proportion which give the latter plastic the major proportion.

The various phenolic bodies containing combined sulphur as aforesaid, especially those containing more than 20 or 30 per cent of sulphur, possess an odor in the crude state which slightly resembles iodoform. The products made by the action of sodium pentasulphide or other alkaline pentasulphides on symmetrical dichlorethylene also possess an odor, quite distinct but of a different character from that of the phenolic plastics. This odor, which to the layman probably would be regarded as a "chemical smell", is objectionable for some purposes and I may therefore blow the material resulting from the reaction with wet steam or superheated steam, which, if desired, may be carried out in vacuum apparatus. The odor of the phenol sulphur plastics is considerably improved by steam treatment.

In some cases it is possible to bring about the incorporation, and possible reaction, of the ethylenedichloride sulphur plastic and the phenol sulphur plastic by melting the latter and adding the former, preferably in a finely divided state, with stirring. A temperature of 140° C. may be employed. In this way proportions ranging from a major to a minor content of each constituent may be secured. If the ethylenedichloride plastic is of the soft rubbery type, somewhat resembling factis, and the phenol sulphur plastic is of the nature of the hard brittle resin, the change in physical qualities on incorporation is striking; the brittle qualities of the resin receding as the rubbery plastic increases in proportion. In this way I am able to make a series of plastic bodies which may be used as binders in the various plastic industries; these products differing little by little from one extreme to the other.

In one form, as I have indicated above, the rubbery or factis type of material normally having a tendency to "shortness", that is breaking rather easily somewhat in the manner of factis, may have this crumbling tendency overcome by incorporation of the phenol sulphur compound aforesaid, especially if the latter is made with moderate proportions of sulphur chloride consistent with proper miscibility. In this manner I aim to avoid any crumbling qualities of the ethylenedichloride sulphur plastic which would make it difficult to employ readily on mixing rolls when incorporating rubber or other substances. The phenol sulphur plastic, by producing greater extensibility, overcomes the aforesaid crumbling property and may thus serve as a blending and softening or plasticizing agent.

While carbon tetrachloride, ethane tetrachloride and unsymmetrical ethylenedichloride do not react with aqueous alkaline polysulphide to form plastics simply by heating at atmospheric pressure, the performance of the invention does not preclude the employment of other reactive plastic forming ethylene compounds or similarly reacting propylene and higher olefine raw materials or mixtures of any of these, in conjunction or association with another sulphur plastic miscible therewith. The phenolic sulphur resins or balsams which I prefer for this purpose are substantially non-volatile and hence remain incorporated with the ethylenedichloride sulphur plastic on exposure.

What I claim is:

1. A composition comprising a plastic sulphured ethylene and a sulphurized phenol plastic miscible therewith.

2. A composition comprising a plastic sulphured ethylene and a sulphurized phenol plastic miscible therewith, said composition being deodorized.

3. A composition comprising ethylenedichloride sulphur plastic material and phenol sulphur chloride plastic miscible therewith, the composition having greater extensibility than either component separately.

4. The process which comprises reacting on symmetrical dichlorethylene with aqueous alkaline polysulphide in the presence of sulphurized phenol, whereby a substance of high plasticity results.

5. A composition comprising a sulphurized ethylene plastic and a non-volatile sulphurized resinous substance miscible therewith.

6. A composition comprising a sulphurized ethylene plastic and a non-volatile resinous substance containing combined sulphur readily miscible therewith, such materials being well mixed together.

CARLETON ELLIS.